(12) United States Patent
Agarwal et al.

(10) Patent No.: US 7,557,154 B2
(45) Date of Patent: Jul. 7, 2009

(54) POLYMER COMPOSITIONS, METHOD OF MANUFACTURE, AND ARTICLES FORMED THEREFROM

(75) Inventors: Naveen Agarwal, Evansville, IN (US); Satish Kumar Gaggar, Parkersburg, WV (US); Deval Gupta, Bangalore (IN); Samik Gupta, Bangalore (IN); Raja Krishnamurthy, Bangalore (IN); Nisha Preschilla, Bangalore (IN); Rajashekhar Shiddappa Totad, Karnataka (IN); Sandeep Tyagi, Bangalore (IN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 636 days.

(21) Appl. No.: 11/020,835

(22) Filed: Dec. 23, 2004

(65) Prior Publication Data
US 2006/0142455 A1 Jun. 29, 2006

(51) Int. Cl.
*C08K 3/30* (2006.01)
(52) U.S. Cl. ................ 524/423; 524/502; 524/449; 524/451; 524/447; 524/431
(58) Field of Classification Search ............... 524/423, 524/502, 449, 451, 447, 437
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,154,775 A | 5/1979 | Axelrod | |
| 4,217,438 A | 8/1980 | Brunelle et al. | |
| 4,579,906 A | 4/1986 | Zabrocki et al. | |
| 4,647,602 A | 3/1987 | Wilczak et al. | |
| 4,746,701 A | 5/1988 | Kress et al. | |
| 4,810,739 A | 3/1989 | Lindner et al. | |
| 5,484,875 A | 1/1996 | Sakashita et al. | |
| 5,804,654 A | 9/1998 | Lo et al. | |
| 5,879,791 A | 3/1999 | Kato et al. | |
| 5,900,446 A | 5/1999 | Nishihara et al. | |
| 5,962,587 A | 10/1999 | Gaggar et al. | |
| 6,025,441 A | 2/2000 | Koshirai et al. | |
| 6,117,542 A | 9/2000 | Nanba et al. | |
| 6,127,465 A | 10/2000 | Nodera | |
| 6,506,871 B1 | 1/2003 | Silvi et al. | |
| 6,518,319 B1 | 2/2003 | Empie et al. | |
| 6,737,465 B2 | 5/2004 | Seidel et al. | |
| 6,812,320 B2 | 11/2004 | Silva et al. | |
| 2003/0149223 A1 | 8/2003 | McCloskey et al. | |

FOREIGN PATENT DOCUMENTS

| | | |
|---|---|---|
| EP | 0 755 977 A2 | 1/1997 |
| EP | 0 846 729 A2 | 6/1998 |
| JP | 11 034150 A | 2/1999 |
| WO | WO 98/44876 * | 10/1998 |

OTHER PUBLICATIONS

ISO 180 "Plastics—Determination of Izod Impact Strength" Third Edition 2000 (15 pgs).
ISO 178 "Plastics—Determination Of Flexural Properties" Fourth Edition 2001 (20 pgs).
ISO 178 "Plastics—Determination Of Flexural Properties" Amendment 1: Precision Statement 2004 (8 pgs).
ISO 527-1 "Plastics—Determination of Tensile Properties" Part 1: General 1Principles First Edition 1993 (12 pgs).
ISO 527-2 "Plastics—Determination of Tesile Properties" Part 2: Test Conditions For Moulding and Extrusion Plastics First Edition 1993 (8 pgs).
ISO 527-3 "Plastics Determination of Tensile Properties" Part 3: Test Conditions For Films and Sheets First Edition 1995 (10 pgs).
ISO 527-4 "Plastics—Determination of Tensile Properties" Part 4: Test Conditions For Isotropic And Orthotropic Fibre-Reinforced Plastic Composites, First Edition 1997 (16 pgs).
ISO 527-5 "Plastics—Determination of Tensile Properties" Part 5: Test Conditions for Unidirectional Fibre-Reinforced Plastic Composites First Edition 1997 (12 pgs).
UL 94 "Test For Flammability of Plastic Materials For Parts in Devices and Appliances" Fifth Edition 1996 (51 pgs).

* cited by examiner

Primary Examiner—Robert D. Harlan

(57) ABSTRACT

A polymer composition is disclosed, which comprises a matrix polymer, a fluoropolymer that may be at least partially encapsulated by an encapsulating polymer, and a filler. Methods for making the polymer compositions and articles made of such compositions are also disclosed. The compositions and article can have improved tensile modulus, ductility, and/or impact properties.

26 Claims, No Drawings

POLYMER COMPOSITIONS, METHOD OF MANUFACTURE, AND ARTICLES FORMED THEREFROM

CROSS-REFERENCE TO RELATED APPLICATION

This application claim priority to U.S. Ser. No. 10/748,393, filed Dec. 30, 2003, which is incorporated herein by reference in its entirety.

BACKGROUND OF THE INVENTION

This disclosure relates to polymer compositions, methods to synthesize the polymer compositions and articles made from the compositions.

Many polymer-based articles are manufactured by injection or other molding processes. In order to obtain good mechanical properties such as high modulus, different approaches have been tried, such as use of filler to reinforce the polymers. Different types of fillers such as glass fibers, aramid fibers, carbon fibers, and various particulate fillers have been used. However, addition of these fillers often leads to brittle failure of the polymer and can lower the impact strength of the resin. Where improved ductility has been obtained, such as in the case of aramid fillers, the modulus obtained is very low. In addition, use of fillers can present processing difficulties, due at least in part to lack of compatibility of the filler with the polymer matrix. Such incompatibility can also result in molding and flow-related problems.

Despite advances in the art and the success of many filled polymer compositions, there remains a continuing need for improved combinations of properties such as higher modulus, improved ductility, improved impact, and/or improved melt flow characteristics, so that molding operations can be performed more rapidly and with improved economics. Also it is desirable that the article has good impact resistance and ductility without the consequent loss of other desirable characteristics. Typically, it is difficult to obtain high modulus, good flow, and good ductility and impact strength in a particular polymer composition.

Polytetrafluoroethylene (PTFE) fibers have been used as fillers in polymer compositions, but can aggregate in the matrix resin, making it very difficult to obtain a uniform composition. Polytetrafluoroethylene and other fluoropolymers have also been used as additives in thermoplastic polymers in order to improve certain properties of the polymers. The use of relatively small amounts, for example about 0.1 to about 1 percent by weight, of fluoropolymers as an anti-drip additive in flame retardant grades of thermoplastic resin molding compositions is described, for example, in U.S. Pat. Nos. 4,810,739, 4,579,906, and 4,810,739. The use of sintered PTFE in highly filled thermoplastic compositions as low friction additives is disclosed in U.S. Pat. No. 5,879,791. A drawback to the use of fluoropolymer additives exists, however, in that such additives have poor dispersibility in many polymers.

U.S. Pat. No. 5,804,654 teaches a process for production of encapsulated fluoropolymer, wherein the encapsulant is any polymer or copolymer obtainable by emulsion polymerization. The encapsulated fluoropolymers are used in a number of polymer compositions, particularly for providing flame retardance to the composition. U.S. Pat. No. 5,962,587 and U.S. Pat. No. 6,025,441 describes thermoplastic polymer compositions comprising encapsulated PTFE where improved mechanical properties were observed. However, the prior art does not appear to recognize or suggest particular combinations or processing for PTFE-containing compositions that provide an optimum balance of mechanical properties. Therefore, there is a continuing in the art for compositions, methods, and articles that can provide a balanced mechanical property profile, particularly improved tensile modulus.

BRIEF DESCRIPTION OF THE INVENTION

In one aspect, a polymer composition comprises a matrix polymer component; a fluoropolymer; and a filler, wherein the polymer composition has a tensile modulus of greater than about 3 GPa measured in accordance with ISO-527.

In another aspect, a composition comprises a combination of a matrix polymer component; a fibrillatable fluoropolymer; and a filler, wherein the fluoropolymer the fluoropolymer is fibrillated by in situ mixing with the matrix polymer and/or filler.

In another aspect, a mixed polymer composition comprises a matrix polymer component; a filler; and a fluoropolymer, wherein the fluoropolymer is fibrillated during mixing with the matrix polymer and/or filler to a degree effective to provide the composition with a higher tensile modulus than the same composition without fibrillation of the fluoropolymer.

Also disclosed are articles comprising the above compositions.

A method of making an article comprises extruding, molding, or shaping the above-described compositions to form an article.

In another aspect, a method of the making a melt-blended polymer composition comprises mixing a matrix polymer component; a fibrillatable fluoropolymer; and a filler, at a temperature and shear effective to produce a composition having a tensile modulus at break of greater than about 3 GPa, measured in accordance with ISO-527.

Yet another aspect is a composition formed by the above method.

Various other features, aspects, and advantages of the present invention will become more apparent with reference to the following description, examples, and appended claims.

DETAILED DESCRIPTION OF THE INVENTION

In this specification and in the claims, which follow, reference will be made to a number of terms which shall be defined to have the following meanings.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

"Combination" as used herein includes mixtures, copolymers, reaction products, blends, composites, and the like.

The endpoints of all ranges reciting the same characteristic are independently combinable and inclusive of the recited endpoint. Values expressed as "greater than about" or "less than about" are inclusive the stated endpoint, e.g., "greater than about 3.5" encompasses the value of 3.5.

As used herein the term "polycarbonate" refers to polycarbonates incorporating structural units derived from the reaction of one or more dihydroxy aromatic compounds and one or more carbonate precursors, and includes copolymers of polycarbonates such as polyester carbonates.

Mixed polymer compositions comprising at least one matrix polymer, at least one fibrillated fluoropolymer, and at least one filler have unexpectedly improved properties when the fluoropolymer is fibrillated in situ during the mixing process. In particular, improved mechanical properties such as coefficient of thermal expansion (CTE), ductility, impact strength, and/or tensile modulus may be achieved, compared to compositions produced from a pre-fibrillated fluoropolymer, under conditions where the fluoropolymer is not fibrillated, or where a filler is not present. The fluoropolymer may be at least partially encapsulated by an encapsulating polymer, or used without any encapsulation, i.e., in its neat form.

The matrix polymer component comprises one or more polymers that are not fibrillated during the mixing process described herein. Examples of suitable matrix polymers include, but are not limited to, amorphous, crystalline, and semi-crystalline thermoplastic materials such as polyolefins (for example, linear or cyclic polyolefins such as polyethylene, chlorinated polyethylene, polypropylene, and the like); polyesters (for example, polyethylene terephthalate, polybutylene terephthalate, polycyclohexylmethylene terephthalate, and the like); arylate esters; polyamides; polysulfones (including hydrogenated polysulfones, and the like); polyimides; polyetherimides; polyether sulfones; polyphenylene sulfides; polyether ketones; polyether ether ketones; ABS resins; polystyrenes (for example hydrogenated polystyrenes, syndiotactic and atactic polystyrenes, hydrogenated polystyrenes such as polycyclohexyl ethylene, styrene-co-acrylonitrile, styrene-co-maleic anhydride, and the like); polybutadiene; polyacrylates (for example, polymethylmethacrylate (PMMA), methyl methacrylate-polyimide copolymers, and the like); polyacrylonitrile; polyacetals; polycarbonates; polyphenylene ethers (for example, those derived from 2,6-dimethylphenol and copolymers with 2,3,6-trimethylphenol, and the like); ethylene-vinyl acetate copolymers; polyvinyl acetate; liquid crystalline polymers; fluoropolymers such as ethylene-tetrafluoroethylene copolymer, polyvinyl fluoride, and polyvinylidene fluoride, polytetrafluoroethylene (provided that the fluoropolymer has a lower softening temperature than the fluoropolymer component described below); polyvinyl chloride, polyvinylidene chloride; and combinations comprising at least one of the foregoing polymers. The matrix polymer may generally be provided in any form, including but not limited to powders, plates, pellets, flakes, chips, whiskers, and the like.

In one embodiment, the matrix polymer may be a homopolymer or copolymer of a polyolefin, a homopolymer or copolymer of a polycarbonate, a homopolymer or copolymer of a polyester, a homopolymer or copolymer of a polyphenylene ether, a homopolymer or copolymer of a styrenic polymer, or a combination comprising at least one of the foregoing. Specifically, the matrix polymer may comprise a homopolymer or copolymer comprising at least one of polyethylene, polypropylene, or polybutylene. In another embodiment, the matrix polymer may comprise a polycarbonate, or a combination comprising a polycarbonate Useful polycarbonates comprise at least two repeating units of the general formula (I):

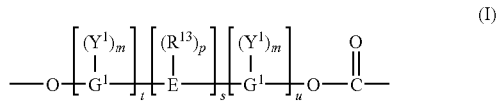

wherein each $G^1$ may be the same or different, and at least 60% of the moieties represented by $G^1$ are aromatic, for example a phenylene, biphenylene, naphthylene, or the like.

E in formula (I) may be a divalent $C_{1-36}$ hydrocarbyl group such as an alkylene, alkylidene, cycloalkylene, or cycloalkylidene group, for example methylene, ethylene, ethylidene, propylene, propylidene, isopropylidene, butylene, butylidene, isobutylidene, amylene, amylidene, isoamylidene, cyclohexylene, and the like. Alternatively, E may be two or more alkylene or alkylidene groups connected by a moiety different from alkylene or alkylidene, such as an aromatic linkage, a tertiary amino linkage, an ether linkage, an ester linkage, a carbonyl linkage, a silicon-containing linkage (for example dimethylsiloxane), a sulfur-containing linkage such as sulfide, sulfoxide, or sulfone, a phosphorus-containing linkage such as phosphinyl, phosphonyl, and like linkages. Alternatively, E may be a tertiary amino linkage (wherein $R^{13}$ is as defined above), an ether linkage, an ester linkage, a carbonyl linkage, a silicon-containing linkage (for example dimethylsiloxane), a sulfur-containing linkage such as sulfide, sulfoxide, or sulfone, a phosphorus-containing linkage such as phosphinyl or phosphonyl, and like linkages.

The letter "p" represents an integer from and including zero through the number of positions on E available for substitution. $R^{13}$, when present, is hydrogen or a monovalent hydrocarbyl group such as a $C_{1-12}$ alkyl, aryl, aralkyl, alkaryl, cycloalkyl, and the like groups.

$Y^1$ in Formula (I) may be a halogen (i.e., fluorine, bromine, chlorine, or iodine); a nitro group; a $C_{1-12}$ alkyl, alkenyl, or allyl group, a $C_{1-12}$ alkyloxy or alkenyl group, and the like, provided that $Y^1$ is substantially inert to and unaffected by the reactants and reaction conditions used to prepare the polycarbonate. The letter "m" in Formula (1) represents any integer from and including zero through the number of positions on $G^1$ available for substitution.

The letter "t" in Formula (I) represents an integer equal to at least one; "s" is either zero or one; and "u" represents zero or one.

Such polycarbonates may be produced by the interfacial reaction of the corresponding dihydroxy compounds with a carbonate precursor. Some illustrative, non-limiting examples of suitable dihydroxy compounds include the dihydroxy-substituted hydrocarbons disclosed by name or formula (generic or specific) in U.S. Pat. No. 4,217,438. A non-exclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'- dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as mixtures comprising at least one of the foregoing dihydroxy compounds.

A nonexclusive list of specific examples of suitable bisphenol compounds includes 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used. Preferred polycarbonates are based on bisphenol A, in which u and t are each one, each $G^1$ is p-phenylene, each m is zero, s is one, and E is isopropylidene.

It is also possible to use two or more different dihydroxy compounds or a copolymer of a dihydroxy compounds with a glycol in the event a carbonate copolymer rather than a homopolymer is desired for use. Branched polycarbonates are also useful, as well as blends of linear polycarbonate and a branched polycarbonate. The branched polycarbonates may be prepared by adding a branching agent during polymerization.

These branching agents are well known, and include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05-2.0 weight percent. Branching agents and procedures for making branched polycarbonates are described in U.S. Pat. Nos. 3,635,895 and 4,001,184, which are incorporated by reference. All types of polycarbonate end groups are contemplated as being useful in the thermoplastic composition.

Methods for the preparation of polycarbonates by interfacial polymerization are also known. Although the reaction conditions of the preparative processes may vary, several of the preferred processes typically involve dissolving or dispersing the dihydric phenol reactant in aqueous caustic soda or potash, adding the resulting mixture to a suitable water immiscible solvent medium and contacting the reactants with the carbonate precursor, such as phosgene, in the presence of a suitable catalyst such as triethylamine or a phase transfer catalyst, and under controlled pH conditions, e.g., about 8 to about 10. The most commonly used water immiscible solvents include methylene chloride, 1,2-dichloroethane, chlorobenzene, toluene, and the like.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ wherein X is $Cl^-$, $Br^-$ or a $C_{1-8}$ alkoxy group or $C_{6-188}$ aryloxy group. An effective amount of a phase transfer catalyst may be about 0.1 to about 10 wt. %, about 0.5 to about 2 wt. % based on the weight of bisphenol in the phosgenation mixture.

Alternatively, melt processes may be used. A catalyst may be used to accelerate the rate of polymerization of the dihydroxy reactant(s) with the carbonate precursor. Representative catalysts include but are not limited to tertiary amines such as triethylamine, quaternary phosphonium compounds, quaternary ammonium compounds, and the like.

Alternatively, polycarbonates may be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

The polycarbonates can be made in a wide variety of batch, semi-batch or continuous reactors. Such reactors are, for example, stirred tank, agitated column, tube, and recirculating loop reactors. Recovery of the polycarbonate can be achieved by any means known in the art such as through the use of an anti-solvent, steam precipitation or a combination of anti-solvent and steam precipitation.

The molecular weight of the polycarbonate product may be varied by controlling, among other factors, the feed rate of the reactants, the type of extruder, the extruder screw design and configuration, the residence time in the extruder, the reaction temperature, and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. In one embodiment, the average molecular weight of the polycarbonate is about 5,000 to about 100,000, more preferably about 10,000 to about 65,000, and most preferably about 15,000 to about 35,000.

In addition to the polycarbonates described above, it is also possible to use combinations of the polycarbonate with other thermoplastic polymers, for example combinations of polycarbonates and/or polycarbonate copolymers with polyesters. Suitable polyesters may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 1 to about 99 wt. % polycarbonate and correspondingly about 99 to about 1 wt. % polyester, in particular a poly(alkylene terephthalate). In one embodiment, the blend comprises about 30 to about 70 wt. % polycarbonate and correspondingly about 70 to about 30 wt. % polyester. The foregoing amounts are base on the total weight of the polycarbonate resin and polyester resin.

The matrix polymer may further be, or include, an impact modifier composition to increase its impact resistance. Thus, the impact modifiers may be present in amounts of about 1 to 100 weight percent (wt. %) of the matrix polymer component, specifically about 5 to about 60 wt. %, more specifically about 10 to about 40 wt. %, with the balance being other matrix polymer material.

These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (II):

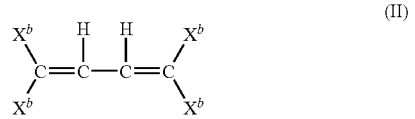

(II)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (III):

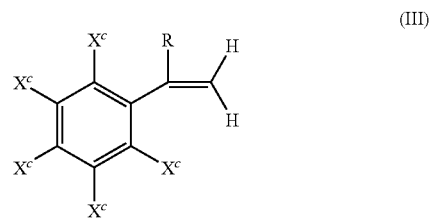

(III)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10):

(IV)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

(Meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (II), (III), or (IV). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2Re$, wherein $R^d$ is hydrogen or a $C_1$-$C_8$ linear or branched hydrocarbyl group and Re is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (III) or (IV), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate, or phosphate surfactants may be used in preparing the impact modifiers, particularly the elastomeric substrate portion of the impact modifiers. Suitable surfactants include, for example $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates, and other basic materials.

Fluoropolymers suitable for use as the fluoropolymer component are capable of being fibrillated ("fibrillatable") during mixing with the matrix polymer, the filler, or both simultaneously. "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations comprising at least one of the foregoing fluoropolymers may also be used.

As is known, fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers may be made by coagulation and drying of dispersion-manufactured fluoropolymers. Fine powder fluoropolymers are generally manufactured to have a particle size of approximately 400 to 500 microns. "Granular" fluoropolymers may be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

In one embodiment the fluoropolymer is at least partially encapsulated by an encapsulating polymer that may be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers.

The encapsulating polymers may be obtained by polymerization of monomers or mixtures of monomers by methods known in the art, for example, condensation, addition polymerization, and the like. Emulsion polymerization, particularly radical polymerization may be used effectively. In one embodiment, the encapsulating polymer is formed from monovinylaromatic monomers containing condensed aromatic ring structures, such as vinyl naphthalene, vinyl anthracene and the like, or monomers of formula (II) above. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of formula (III) above. Examples of monomers of formula (III) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. % of monovinyl aromatic monomer, specifically about 30 to about 100 wt. %, more specifically about 50 to about 90 wt. % monovinylaromatic monomer, with the balance being comonomer(s).

Elastomers may also be used as the encapsulating polymer, as well as elastomer-modified graft copolymers. Suitable elastomers include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers are of formula (IV). Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt. % of one or more monomers copolymerizable therewith. Suitable copolymerizable monomers include the monovinylaromatic monomers of formula (II) and/or the monovinylic monomers of formula (III) above. Specific copolymers include styrene and acrylonitrile.

(Meth)acrylate monomers suitable for use as an elastomeric encapsulating monomer include the cross-linked, particulate emulsion homopolymers or copolymers of $C_{4-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and th like, and combinations comprising at least one of the foregoing monomers. The $C_{4-8}$ alkyl (meth)acrylate monomers may optionally be polymerized in admixture with up to 15 wt. % of comonomers of formulas (II), (III), or (IV). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly (alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly (propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly($C_{4-8}$ alkyl acrylate) rubbers, styrene-butadiene rubbers (SBR), EPDM rubbers, silicon rubber and combinations comprising at least one of the foregoing encapsulating polymers.

In another embodiment, the encapsulating polymer comprises SAN, ABS copolymers, alpha-($C_{1-3}$)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN.

Suitable amounts amount of encapsulating polymer may be determined by one of ordinary skill in the art without undue experimentation, using the guidance provided below. In one embodiment, the encapsulated fluoropolymer comprises about 10 to about 90 weight percent (wt. %) fluoropolymer and about 90 to about 10 wt. % of the encapsulating polymer, based on the total weight of the encapsulated fluoropolymer. Alternatively, the encapsulated fluoropolymer comprises about 20 to about 80 wt. %, more specifically about 40 to about 60 wt. % fluoropolymer, and about 80 to about 20 wt. %, specifically about 60 about 40 wt. % encapsulating polymer, based on the total weight of the encapsulated polymer.

The polymer composition further comprises a filler, including the fillers and solid compounding ingredients or agents commonly used in polymeric compositions. Without being bound by theory, it is believed that the advantageous results obtained herein are due to a synergistic interaction between the filler and fluoropolymer, which interaction arises during the mixing process described below.

One useful class of fillers is the particulate fillers, which may be of any configuration, for example spheres, plates, fibers, acicular, flakes, whiskers, or irregular shapes. Suitable fillers typically have an average longest dimension of about 1 nanometer to about 500 micrometers, specifically about 10 nanometers to about 100 micrometers. The average aspect ratio (length:diameter) of some fibrous, acicular, or whisker-shaped fillers (e.g., glass or wollastonite) may be about 1.5 to about 1000, although longer fibers are also within the scope of the invention. The mean aspect ratio (mean diameter of a circle of the same area: mean thickness) of plate-like fillers (e.g., mica, talc, or kaolin) may be greater than about 5, specifically about 10 to about 1000, more specifically about 10 to about 200. Bimodal, trimodal, or higher mixtures of aspect ratios may also be used.

The fillers may be of natural or synthetic, mineral or non-mineral origin, provided that the fillers have sufficient thermal resistance to maintain their solid physical structure at least at the processing temperature of the composition with which it is combined. Suitable fillers include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IIIb, IVa, IVb (except carbon), Va, VIIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are useful. It has been found that mica, talc, silicon carbide, and combinations comprising at least one of the foregoing fillers are of specific utility.

Alternatively, or in addition to a particulate filler, the filler may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the fillers may be surface modified, for example treated so as to improve the compatibility of the filler and the polymeric portions of the compositions, which facilitates deagglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

The relative amounts of matrix polymer component, fluoropolymer, and filler may be adjusted by one of skill in the art without undue experimentation, in order to achieve the desired properties of the compositions, using the guidance provided below. In one embodiment, the compositions comprise about 5 to about 99 wt. % matrix polymer component (including any impact modifier), about 0.5 to about 40 wt. % unencapsulated fluoropolymer, and about 0.5 to about 60 wt. % filler, each based on the total weight of the composition (matrix, fluoropolymer, filler, and any additives, non-limiting examples of which are described below). Alternatively, the compositions may comprise about 20 to about 90, more specifically about 30 to about 85 wt. %, even more specifically about 50 to about 85 wt. % matrix polymer; about 1 to about 40 wt. %, more specifically about 2 to about 20 wt. %, even more specifically about 2.5 to about 10 wt. % unencapsulated fluoropolymer; and about 3 to about 40 wt. %, more specifically about 5 to about 30 wt. %, even more specifically about 5 to about 15 wt. % filler, each based on the total weight of the composition. Particularly advantageous results may be achieved when the amount of fluoropolymer is greater than about 2.5 wt. %, more specifically about 5 to about 35 wt. %, even more specifically about 10 to about 30 wt. % of the total weight of the composition.

In another embodiment, the compositions comprise about 5 to about 99 wt. % matrix polymer, about 0.5 to about 60 wt. % encapsulated fluoropolymer, and about 0.5 to about 60 wt. % filler, each based on the total weight of the composition. Alternatively, the thermoplastic compositions may comprise about 20 to about 90, more specifically about 30 to about 85 wt. %, even more specifically about 60 to about 85 wt. % matrix polymer; about 1 to about 50 wt. %, more specifically about 2 to about 45 wt. % encapsulated fluoropolymer; and about 0.5 to about 50 wt. %, more specifically about 5 to about 30 wt. %, even more specifically about 5 to about 15 wt. % filler, each based on the total weight of the composition. Particularly advantageous results may be achieved when the amount of encapsulated fluoropolymer is greater than about 2.5 wt. %, more specifically about 5 to about 35 wt. %, even more specifically about 10 to about 30 wt. % of the total weight of the composition.

Optionally the polymer composition may further contain one or more additives ordinarily incorporated in resin compositions of this type, preferably with the proviso that the additive(s)s are selected so as to not significantly adversely affect the desired properties of the thermoplastic composition. Mixtures of additives may be used. Such additives may be mixed at a suitable time during the mixing of the components for forming the composition. Exemplary additives include extenders, lubricants, flow modifiers, fire retardants, pigments, dyes, colorants, UV stabilizers, antioxidants, impact modifiers, plasticizers, optical brighteners, flame proofing agents, anti-static agents, blowing agents, and the like.

Suitable antioxidant additives include, for example, organophosphites such as tris(nonyl phenyl)phosphite, tris(2,4-di-t-butylphenyl)phosphite, (2,4,6-tri-tert-butylphenyl)(2-butyl-2-ethyl-1,3-propanediol)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; acylaminophenols; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.1 to about 5 parts by weight, based on 100 parts by weight of the polymeric portion of the composition (matrix polymer, fluoropolymer, and any impact modifier).

Suit table heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, and combinations comprising at least one of the foregoing heat stabilizers. Heat stabilizers are generally used in amounts of about 0.1 to about 5 parts by weight, based on 100 parts by weight of the polymeric part of the composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.5 to about 20 parts by weight, based on 100 parts by weight of the polymer portion of the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.5 to about 20 parts by weight, based on 100 parts by weight of the polymer portion of the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; sodium, calcium or magnesium salts of fatty acids such as lauric acid, palmitic acid, oleic acid or stearic acid; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax, EBS wax, or the like. Such materials are generally used in amounts of about 0.1 to about 20 parts by weight, based on 100 parts by weight of the polymer portion of the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.05 to about 20 parts by weight, based on 100 parts by weight of the polymer portion of the composition.

Colorants such as pigment and/or dye additives may also be present. Suitable pigments include for example, inorganic pigments such as metal oxides and mixed metal oxides such as zinc oxide, titanium dioxides, iron oxides or the like;

sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 20 parts by weight, based on 100 parts by weight of the polymer portion of the composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.01 to about 20 parts by weight, based on 100 parts by weight of the polymer portion of the composition.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of about 0.01 to about 15 parts by weight, based on 100 parts by weight of the polymer portion of the composition.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

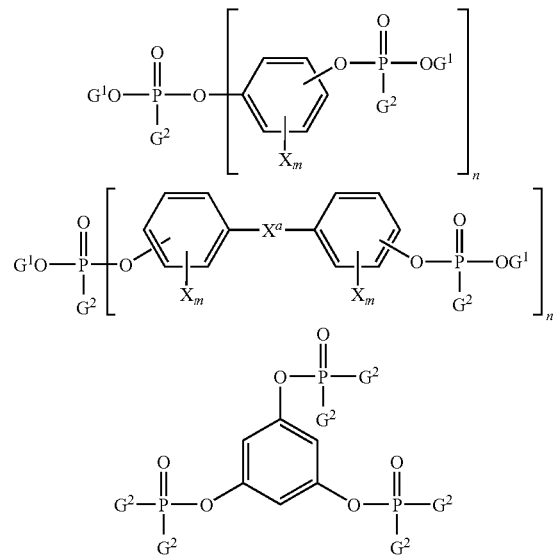

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 60 parts by weight, more specifically about 5 to about 25 parts by weight, based on 100 parts by weight of polycarbonate resin and any impact modifier.

Halogenated materials may also be used as flame retardants, for example halogenated compounds and resins of formula (11):

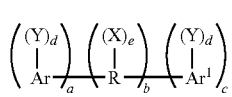
(11)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (11) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 5 to about 50 parts by weight, more specifically about 5 to about 20 parts by weight, based on 100 parts by weight of the polymer portion of the composition.

Alternatively, the thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than about 100 parts per million by weight (ppm), less than about 75 ppm, or less than about 50 ppm. When this definition is applied to the fire retardant it is based on the total weight of the fire retardant. When this definition is applied to the thermoplastic composition it is based on the total weight of the polymer portion of the composition and fire retardant.

Inorganic flame retardants may also be used, for example salts of $C_{2-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 5.0 parts by weight, more specifically about 0.02 to about 3.0 parts by weight, based on 100 parts by weight of the polymer portion of the composition.

Another useful type of flame retardant is a polysiloxane-polycarbonate copolymer comprising repeating structural units of formula (12):

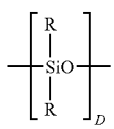

(12)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer. The value of D in formula (8) may vary widely depending on the type and relative amount of each component in the thermoplastic composition, the desired properties of the composition, and like considerations. Generally, D may have an average value of 2 to about 1,000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of the following formula (13):

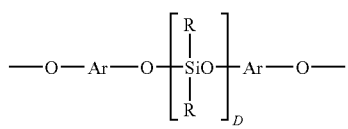

(13)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used. Such units may be derived from the corresponding dihydroxy compound of the following formula:

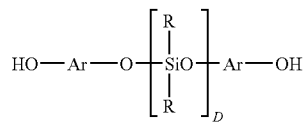

wherein Ar and D are as described above. Such compounds are further described in U.S. Pat. No. 4,746,701 to Kress et al. Compounds of formula (10) may be obtained by the reaction of a dihydroxyarylene compound with, for example, an alpha, omega-bisacetoxypolydiorganosiloxane under phase transfer conditions.

In another embodiment, the polydiorganosiloxane blocks are provided by repeating structural units of formula (13)

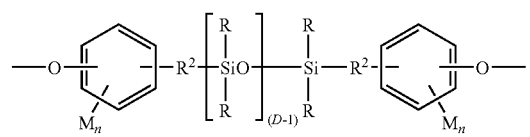

(13)

wherein R and D are as defined above. $R^2$ in formula (10) is a divalent $C_2$-$C_8$ aliphatic group. Each M in formula (9) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4. In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl. Units of formula (10) may be derived from the corresponding dihydroxy polydiorganosiloxane 11):

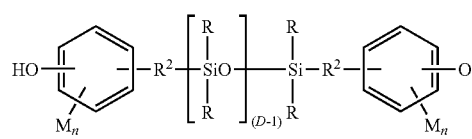

(11)

wherein R, D, M, $R^2$, and n are as described above. Such dihydroxy polysiloxanes can be made by effecting a platinum catalyzed addition between a siloxane hydride of the following formula

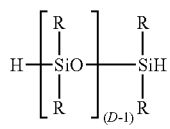

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming polycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of the polymer portion of the composition.

Neutralizing additives may be for example, melamine, polyvinylpyrrolidone, dicyandiamide, triallyl cyanurate, urea derivatives, hydrazine derivatives, amines, polyamides, and polyurethanes; alkali metal salts and alkaline earth metal salts of higher fatty acids, such as for example, calcium stearate, calcium stearoyl lactate, calcium lactate, zinc stearate, magnesium stearate, sodium ricinoleate, and potassium palmitate; antimony pyrocatecholate, zinc pyrocatecholate, and hydrotalcites and synthetic hydrotalcites. Hydroxy carbonates, magnesium zinc hydroxycarbonates, magnesium aluminum hydroxycarbonates, and aluminum zinc hydroxycarbonates; as well as metal oxides, such as zinc oxide, magnesium oxide and calcium oxide; peroxide scavengers, such as, e.g., ($C_{10}$-$C_{20}$) alkyl esters of beta-thiodipropionic acid, such as for example the lauryl, stearyl, myristyl or tridecyl esters; mercapto benzimidazole or the zinc salt of 2-mercaptobenzimidazole, zinc-dibutyldithiocarbamate, dioctadecyldisulfide, and pentaerythritol tetrakis(.beta.-dodecylmercapto) propionate may also be used. When present, the neutralizers may be used in amounts of about 5 to about 50 parts by weight, more specifically about 10 to about 40 parts by weight, based on 100 parts by weight of the polymer portion of the composition.

In yet another embodiment, the optional additive is a polyamide stabilizer, such as, copper salts in combination with iodides and/or phosphorus compounds and salts of divalent manganese. Examples of sterically hindered amines include but are not restricted to triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidinyl) hexane.

The components of the composition are mixed under conditions of shear and temperature effective to produce the desired characteristics in the mixed composition, in particular improved tensile modulus and/or ductility. Without being bound by theory, it is believed that such improvements are achieved by in situ fibrillation of the fluoropolymer. Suitable mixing methods for achieving the desired shear and temperature conditions may be, for example, extrusion kneading, roll kneading, or mixing in a two-roll mill, a Banbury mixer, a single screw or twin-screw extruder, a double blade batch mixer, a vertical shaft mixer, a planetary mixer, a Becken blade mixer, a dispersion blade mixer, a sigma mixer, in continuous batch mixers of the hydrofoil, turbine blade, or CF impeller blade type, static mixers and the like devices, which are capable of imparting a controlled degree of shear. In one embodiment a single screw or a twin-screw extruder is used. The twin-screw extruder may be co-rotating, counter rotating, intermeshing, non-intermeshing, or the like, for example a, planetary gear extruder readco continuous mixer. The mixing may be conducted in a continuous or a batch process. When melt blending or reactive melt blending is used, the mixing is generally conducted at a temperature and for a time effective to produce a molten mixture of a substantially homogenous composition.

The time, temperature, apparatus, component addition sequence and location (along an extruder, e.g.), and other conditions of mixing are accordingly selected so as to produce a composition having an improved modulus compared to compositions not containing both filler and fluoropolymer. Those of ordinary skill in the art will be able to adjust the degree of shear and temperature, as well as other parameters, without undue additional experimentation using the guidance provided herein.

In one embodiment, the polymer compositions may be prepared by pre-combining the matrix polymer, fluoropolymer, and filler prior to mixing under suitable conditions of temperature and shear, although such pre-combining is not necessary. The pre-combining may be carried out in any conventional mixer (e.g., drum mixer, ribbon mixer, vertical spiral mixer, Muller mixer, sigma mixer, chaotic mixer, static mixer, and the like). Pre-combining is typically carried out at a temperature below the degradation temperature of the matrix polymer, fluoropolymer, and any encapsulating polymer. Alternatively, a portion of the matrix polymer may be pre-combined with the fluoropolymer (with or without one or more additives) to prepare a masterbatch, and then the remaining matrix polymer may be added and mixed therewith later.

In general, suitable mixing (fibrillation) conditions include temperatures at or above the glass transition temperature of the matrix polymer and below the softening temperature of the fluoropolymer. The mixing temperature is also preferably below the degradation temperature of the matrix polymer. Suitable temperatures may be about 20° C. to about 450° C., more specifically about 50° C. to about 400° C., even more specifically about 100° C. to about 300° C. At these temperatures, processing may be conducted for about 2 seconds to about 10 hours, specifically about 3 seconds to about six hours.

For compositions comprising a polycarbonate-containing matrix polymer component, the mixing may be carried out in a twin-screw extruder, using for example, a temperature profile in the range of 20-300° C., for example 50, 200, 250, 260, 270, 270, 275° C., a feed rate of 5-25 kilogram/hour, and a torque of 50-80%, specifically 60-65%. Such conditions will yield a network, or node and fibril structure in the fluoropolymer.

A modulated differential scanning calorimetry (DSC) method for determining extent of fibrillation of the fluoropolymer in the various compositions was may be used to monitor the course and degree of fibrillation. For example a Q1000 differential scanning calorimeter from TA Instruments may be used to conduct DSC is conduct on approximately 1 to 5 mg of sample, and observations recorded around 320 to 360° C. (modulation range). A peak around 330° C. is observed, and may be deconvoluted into three different peaks, wherein the different peak temperatures correspond to different forms of fluoropolymer. A plot was constructed using the raw data points from MDSC, and through baseline adjustment a clear magnified peak was observed (after subtraction). Deconvolution was made to fit gauss Ian curves around 326° C. for melt crystallized PTFE, 330° C. for fibrillated PTFE, and 338° C. for native PTFE (nodal PTFE). The area under each curve was found to have a strong correlation with optimization of properties such as tensile modulus. In particular, a Node:Fibril ratio may be calculated based on the area under 338° C. peak (node) and 330° peak (fibril).

In one embodiment, the mixed fluoropolymer comprises fibrils having an average diameter of about 5 nanometers to about 2 micrometers. The fluoropolymer may also have an average fibril diameter of about 30 to about 750 nanometers, more specifically about 5 to about 500 nanometers. (Average diameters may be measured by scanning electron microscopy (SEM)). The ratio of the node fraction to fibril fraction (as reflected in the area under the curve in the DSC determinations) of the mixed fluoropolymers may be less than about 2.5, specifically less than about 2, and even more specifically less than about 1.

After mixing, the composition so formed may be made into a particulate form, for example by pelletizing or grinding. For example, the molten mixture from an extruder may be fed into a die. Some nonlimiting examples of suitable dies include an annular die, coat hanger die, spiral mandrel die, crosshead die, T-die, fishtail die, spider die, single, or double roller die, or profile extrusion die.

In an advantageous feature, the mixed compositions of the present invention have a tensile modulus of about 1.5 GPa to about 20 GPa, specifically about 2.5 to about 15, more specifically about 3.5 to about 10 GPa, where tensile modulus may be determined in accordance with ISO 527 at room temperature, using a rate of pull of 1 mm/minute until 1% strain followed by 5 mm/minute until the sample breaks. In some embodiments, the improved modulus may be obtained without significant degradation of the other properties of the composition. In other embodiments, the improved modulus is obtained together with good ductility and/or good flow.

The mixed compositions may have good or improved ductility, as reflected by nominal elongation at break, notched Izod impact, strength, and/or diametral impact strength. For example, the mixed compositions may have a nominal elongation at break of greater than 20%. In another embodiment, the nominal elongation at break may be about 200 to about 20%, specifically about 100 to about 30%. Compositions having a tensile modulus of greater than about 3.5 GPa, together with a nominal elongation at break of greater than about 20%, greater than about 30%, greater than about 40%, or greater than about 50%, may be achieved, as well as compositions having a tensile modulus of greater than or about 4 GPa, together with a nominal elongation at break of greater about 30%, greater than about 40%, or greater than about 50%. Again, tensile modulus and elongation to break may be determined in accordance with ISO 527 at room temperature, using a rate of pull of 1 mm/minute until 1% strain followed by 5 mm/minute until the sample breaks.

The mixed compositions may have an unnotched impact strength, determined in accordance with ISO 180/U at room temperature, of about 40.0 or higher (No break (NB)), specifically about 60 to NB, more specifically about 100 to about 180 kilojoules per square meter ($KJ/m^2$).

The flexural modulus of the compositions may be about 1.0 to about 20 GPa, specifically about 2 to about 15 Gpa, more specifically about 2.5 to about 10 GPa, measured in accordance with ISO 178, at room temperature.

The flexural strength of the compositions may be about 50 to about 200 MPa, specifically about 60 to about 150 Mpa, more specifically about 80 to about 120 MPa, measured in accordance with ISO 178, at room temperature with a pulling speed of 2 mm/min.

The mixed compositions may have an notched impact strength, determined in accordance with ISO 180 at 23° C., of about 5 to about 120, specifically about 10 to about 100, more specifically about 15 to about 50 kilojoules per square meter ($KJ/m^2$).

The mixed compositions may have a CTE of less than about $5.5 \times 10^{-5}$ m/m/° C. (measured over −40 to 80° C.). More specifically, the mixed compositions may have a CTE of less than about $5.0 \times 10^{-5}$ m/m/° C., less than about $4.5 \times 10^{-5}$ m/m/° C., less than about $4.0 \times 10^{-5}$ m/m/° C., less than about $3.5 \times 10^{-5}$ m/m/° C., or less than about $3.0 \times 10^{-5}$ m/m/° C. (each measured over −40 to 80° C.). In still other embodiments, the range of acceptable CTEs may be somewhat broader, that is, a CTE of about $10 \times 10^{-5}$ m/m/° C. to about $2 \times 10^{-5}$ m/m/° C., more specifically about $8 \times 10^{-5}$ m/m/° C. to about $3 \times 10^{-5}$ m/m/° C. (each measured over −40 to 80° C.). In another embodiment, the mixed compositions may have a CTE of less than about $5.5 \times 10^{-5}$ m/m/° C. (measured over −40 to 120° C.). More specifically, the mixed compositions may have a CTE of less than about $5.0 \times 10^{-5}$ m/m/° C., less than about $4.5 \times 10^{-5}$ m/m/° C., less than about $4.0 \times 10^{-5}$ m/m/° C., less than about $3.5 \times 10^{-5}$ m/m/° C., or less than about $3.0 \times 10^{-5}$ m/m/° C. (each measured over −40 to 120° C.). Again, in still other embodiments, the CTE may be somewhat broader, that is, a CTE of about $10 \times 10^{-5}$ M/m/° C. to about $2 \times 10^{-5}$ m/m/° C., more specifically about $8 \times 10^{-5}$ m/m/° C. to about $3 \times 10^{-5}$ m/m/° C. (each measured over −40 to 120° C.). The CTE may be determined using ASTM E-831.

It is also possible to manufacture compositions having good flame retardance, that is, compositions wherein a sample having a thickness of 1.2 mm or greater achieves a UL94 rating of V1. It is also possible to manufacture compositions wherein a sample having a thickness of 1.2 mm or greater achieves a UL94 rating of V0. Such compositions may further, at a thickness of 1.5 mm, achieve a UL94 rating of V1 and/or V0. Flame retardancy tests were performed following the procedure of Underwriter's Laboratory Bulletin 94 entitled "Tests for Flammability of Plastic Materials, UL94." According to this procedure, materials may be classified as HB, V0, V1, V2, VA and/or VB on the basis of the test results obtained for five samples. To achieve a rating of V0, in a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds. To achieve a rating of V1, in a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

Flame retardant additives as described above may be used to aid in achieving flame retardancy. When present, such additives may affect the mechanical properties of the compositions, particularly nominal elongation to break. The nominal elongation to break of flame retardant compostions may be about 1% to about 15%, specifically about 3% to about 12%, more specifically greater about 5% to about 10%, determined in accordance with ISO 527 at room temperature, using a rate of pull of 1 mm/minute until 1% strain followed by 5 mm/minute until the sample breaks.

In addition, the compositions may have good weatherability, as evidenced by improved resistance to ultraviolet radiation, maintenance of gloss, solvent resistance, recycling capability by regrind, and the like. In one embodiment, good mechanical properties are obtained in combination with good flow properties, in particular flow properties that render the compositions suitable for injection molding of thin wall parts (e.g., parts having a wall thickness of less than about 2.5 mm, less than about 2.0 mm, or even less than about 1.5 mm). Flow properties for the molding of small parts may also be achieved, as well as flow properties for the molding of large parts such as automobile door panels, fenders, bumpers, and the like.

The melt blended compositions can be molded into useful articles by a variety of means, for example injection molding, extrusion molding, rotation molding, foam molding, calendar molding, blow molding, thermoforming, compaction, melt spinning, and the like, to form articles. Because of their advantageous mechanical characteristics, especially preferred are articles that will be exposed to ultraviolet (UV) light, whether natural or artificial, during their lifetimes, and most particularly outdoor and indoor articles. Suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications.

The invention is further illustrated by the following non-limiting examples.

Polycarbonate ("PC," LEXAN® 105, from General Electric Company) was used as the matrix polymer in the following examples. The fluoropolymer used was PTFE/SAN, synthesized by aqueous emulsion polymerization as disclosed in U.S. Pat. No. 5,804,654, except where noted. All compositions further included up to 1 wt. % lubricant and up to 2 wt. % of an antioxidant package.

The components (amounts expressed in percent weight, based on the total weight of the polymer composition) shown in Tables 1 and 2 were subjected to dry mixing, fed into a ZSK 25 co-rotating twin-screw extruder from WERNER and PFLEIDERER Coextruder, and mixed at a barrel temperature of about 275° C., maintaining a torque at 80 percent, and a screw rotation rate of 300 rotations per minute (rpm). The extrudate was then fed into a high-speed pelletizer.

The resulting pellets were dried for at least 4 hours at 80° C. before injection molding into mold suitable for the formation of ASTM/ISO test specimens. An L&T Demag De-Tech 60T LNC4-E injection molding machine was used, operated at a temperature of about 280° C.

Tensile modulus, yield stress, nominal elongation to break (break strain), unnotched Izod impact strength, and CTE were determined in accordance with the above ISO methods. "NB" in the following Tables means that the sample did not break, and may therefore be considered high impact.

Results for examples 1-27 are shown in Table 1.

TABLE 1

| Ex. No. | Resin | Filler Type | Filler (wt. %) | Fluoro-polymer (wt. %) | Tensile Modulus (Gpa) | Yield Stress (Mpa) | Break Strain (%) | Unnotched Impact Strength (KJ/m$^2$) | CTE ($\times 10^{-5}$) m/m/° C. |
|---|---|---|---|---|---|---|---|---|---|
| 1  | PC | Silicon Carbide (8 μm)              | 10   | 15   | 4.07 | 72.98 | 9.28  | NB     | —       |
| 2  | PC | Mica (55 μm)                        | 10   | 10   | 4.57 | 70.84 | 17.15 | NB     | —       |
| 3  | PC | Silicon carbide (0.4 μm)            | 10   | 10   | 3.62 | 69.77 | 74.68 | NB     | —       |
| 4  | PC | Wollastonite [f]                    | 10   | 10   | 4.10 | 69.32 | 42.40 | NB     | —       |
| 5  | PC | Wollastonite [g]                    | 10   | 10   | 4.03 | 68.87 | 41.04 | NB     | —       |
| 6  | PC | Epoxy-coated Mica (55 μm)           | 10   | 10   | 4.36 | 74.49 | 16.64 | NB     | —       |
| 7  | PC | Hydrous Aluminosilicate [a]         | 10   | 10   | 4.00 | 72.83 | 42.98 | NB     | —       |
| 8  | PC | Wollastonite (10 μm) [b]            | 10   | 10   | 4.00 | 73.88 | 11.80 | NB     | —       |
| 9  | PC | Epoxy-coated Talc                   | 10   | 10   | 4.68 | 76.56 | 17.36 | NB     | —       |
| 10 | PC | Mica + Pigment (9 + 1 by weight)    | 10   | 10   | 4.61 | 71.96 | 18.36 | NB     | —       |
| 11 | PC | Mica [d]                            | 10   | 10   | 4.58 | 74.30 | 17.46 | NB     | —       |
| 12 | PC | Carbon fiber [c]                    | 10   | 0    | 3.53 | 68.04 | 12.37 | 150.98 | —       |
| 13 | PC | Carbon fiber [c]                    | 10   | 10   | 5.74 | 76.74 | 6.72  | 154.25 | —       |
| 14 | PC | Carbon Fiber [c] + Mica (55 μm) (1:1 by weight) | 10 | 10 | 4.94 | 73.47 | 5.61 | 194.78 | — |
| 15 | PC | Mica (6 μm + 55 μm)                 | 10   | 10   | 5.20 | 75.88 | 32.56 | NB     | —       |
| 16 | PC | Mica (6 μm + 10 μm)                 | 10   | 10   | 4.80 | 73.55 | 43.17 | NB     | —       |
| 17 | PC | Mica [h] (10 μm)                    | 10   | 10   | 5.17 | 76.94 | 20.73 | NB     | —       |
| 18 | PC | Mica [d]                            | 10   | 10   | 5.83 | 64.05 | 6.16  | —      | —       |
| 19 | PC | Mica [d] (6 μm)                     | 10   | 10   | 5.15 | 76.80 | 64.20 | NB     | 4.05 [k] |
| 20 | PC | Silicon carbide (8 μm)              | 10   | 15   | 4.07 | 72.98 | 9.28  | NB     | —       |
| 21 | PC | Mica [i] (55 μm)                    | 5    | 5    | 3.39 | 66.68 | 76.17 | NB     | —       |
| 22 | PC | Mica [i] (55 μm)                    | 7.5  | 7.5  | 4.04 | 69.02 | 61.39 | NB     | —       |
| 23 | PC | Mica [d] (6 μm)                     | 12.5 | 12.5 | 6.37 | 81.92 | 19.88 | NB     | —       |
| 24 | PC | Mica [d] (6 μm)                     | 15   | 15   | 7.19 | 84.44 | 11.48 | 233.23 | 3.60 [k] |
| 25 | PC | Mica [d] (6 μm)                     | 15   | 12.5 | 6.87 | 83.88 | 15.18 | NB     | —       |
| 26 | PC | Silicon carbide [j] (0.4 μm)        | 10   | 15   | 4.14 | 73.13 | 34.85 | NB     | —       |
| 27 | PC | Nanoclay [e]                        | 2.5  | 10   | 3.72 | 70.10 | 4.11  | 196.05 | —       |

[a] Engelhard-ASP NC
[b] Wolkem 1008
[c] Fortafil 202
[d] Alsibronz 6
[e] Closite 20A
[f] NYCO 1
[g] NYCO 1
[h] Alsibronz 10
[i] Alsibronz 55
[j] Silicon carbide
[k] measured over −40 to +80° C.

The above data shows that compositions in accordance with the present invention have excellent modulus, as reflected, for example by Ex. 19. The CTE of certain of the examples is also excellent, in the range of 4.05×10$^{-5}$ m/m/° C. The properties of samples using mica or talc as fillers showed particularly good results.

Additional examples 28-37 in accordance with the invention were prepared, in which the matrix polymer composition and/or additives were varied as indicated (all amounts are in weight percent). The Examples were prepared and tested as described above. Results are shown in Table 2.

TABLE 2

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m$^2$) | CTE ($\times 10^{-5}$ m/m/° C.) |
|---|---|---|---|---|---|---|---|---|---|
| 28 | PC/ABS (28%)   | Mica (6 μm) | 10 | 10 | 4.66 | 68.19 | 27.25 | NB     | 4.64 [k] |
| 29 | PC             | Talc        | 10 | 5  | 4.25 | 69.21 | 41.34 | NB     | —        |
| 30 | PC/Epoxy [a] (5%) | Mica (6 μm) | 10 | 10 | 5.68 | 84.63 | 23.29 | NB     | —        |
| 31 | PC/BPADP (5%)  | Mica (6 μm) | 10 | 10 | 5.79 | 83.40 | 17.57 | 224.44 | —        |
| 32 | PC/ABS (18%)   | Talc        | 10 | 5  | 3.92 | 60.24 | 60.94 | NB     | —        |
| 33 | PC             | Mica (6 μm) | 10 | 5  | 4.94 | 71.79 | 22.92 | NB     | —        |

TABLE 2-continued

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m$^2$) | CTE ($\times 10^{-5}$ m/m/° C.) |
|---|---|---|---|---|---|---|---|---|---|
| 34 | PC/PBT (60/40) | Mica (6 μm) | 10 | 10 | 5.5 | 80.5 | 16.23 | NB | 6.12 |
| 35 | PC/PBT/MBS (40/35/10) | Mica (6 μm) | 7.5 | 7.5 | 3.94 | 64.01 | 43.11 | NB | — |
| 36 | PC/PBT/MBS (37/33.5/9.5) | Mica (6 μm) | 10 | 10 | 4.63 | 66.91 | 18.76 | NB | — |
| 37 | ABS | Mica (6 μm) | 10 | 15 | 4.32 | 57.84 | 11.26 | — | — |

ABS = acrylonitrile butadiene styrene copolymer;
BPADP = bisphenol A diphenylphosphate;
PBT = polybutylene terephthalate;
MBS = methylmethacrylate butadiene styrene copolymer.
[a] Araldite GT 6071/6095 (DGEBA Type Epoxy)
[k] measured over −40 to +80° C.

The above results show that excellent results can be obtained using a variety of polymer matrix systems.

Comparative Examples 38-40 and Examples 41 in accordance with the invention were prepared using the above procedure and ABS as a polymer matrix. Results are shown in Table 3 below.

TABLE 3

| Ex. No. | Resin | Filler Type | Filler (wt. %) | Fluoro-polymer (wt. %) | Tensile Modulus (GPa) | Yield Stress (Mpa) | Unnotched Impact Strength (KJ/m2) |
|---|---|---|---|---|---|---|---|
| 38 | ABS | — | — | — | 2.396 | 48.784 | 93.15 |
| 39 | ABS | — | — | 5% | 2.734 | 51.412 | 89.22 |
| 40 | ABS | — | — | 10 | 2.78 | 51.23 | 64.7 |
| 41 | ABS | Mica | 10 | 10 | 3.92 | — | — |

ABS = acrylonitrile butadiene styrene copolymer

The above results show that the methods of the present invention can be used with polymer systems such as ABS.

Examples 13, 14, 19, 21, 38, and 35 were further tested for flame retardancy in accordance with UL 94, and gloss in accordance with ASTM D 523. The gloss for the samples were measured using the. Results are shown in Table 4 below.

The above examples show the excellent flame retardancy and gloss can be obtained for the examples of the present invention.

TABLE 4

| Ex. No. | Resin | Filler Type | Filler (wt. %) | Fluoro-polymer (wt. %) | Flame Retardancy (UL Rating at 1.5 mm) | Flame Retardancy (UL Rating at 1.2 mm) | Gloss at 60° C. |
|---|---|---|---|---|---|---|---|
| 13 | PC | Carbon fiber [c] | 10 | 10 | —55 | — | 55 |
| 14 | PC | Carbon fiber [c] + mica [i] (55 μm) (1:1) | 10 | 10 | V0 | V0 | 40 |
| 19 | PC | Mica (6 μm) | 10 | 10 | V1 | V1 | 51 |
| 28 | PC/ABS (28%) | Mica (6 μm) | 10 | 10 | — | — | 55 |
| 31 | PC/BPADP (5%) | Mica (6 μm) | 10 | 10 | V0 | V0 | 53 |
| 35 | PC/PBT (60/40) | Mica (6 μm) | 10 | 10 | — | — | 44 |

BPADP = bisphenol A diphenylphosphate
[c] Fortafil 202
[i] Alsibronz 55

A set of Comparative Examples (C1-C16) was prepared in accordance with Table 5, using the procedure described above. Comparative Example 1 (C1) omits the filler and the fluoropolymer. C2-C11 omit the fluoropolymer. Comparative examples C12-C16 show the effects of omitting the filler. Results are shown in Table 5.

TABLE 5

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m²) | CTE (×10⁻⁵ m/m/° C.) |
|---|---|---|---|---|---|---|---|---|---|
| C1 | PC | — | 0 | 0 | 2.31 | 62.65 | 84.40 | NB | 8.04 |
| C2 | PC | Mica (55 μm) | 10 | 0 | 3.39 | 68.79 | 7.89 | 82.8 | — |
| C3 | PC | Talc | 10 | 0 | 3.49 | — | 6.88 | 11.3 | — |
| C4 | PC | Epoxysilane-coated talc | 10 | 0 | 2.75 | 65.64 | 12.51 | 116.7 | — |
| C5 | PC | Wollastonite $^f$ | 10 | 0 | 3.41 | | 0.38 | 12.5 | — |
| C6 | PC | Wollastonite $^f$ | 10 | 0 | 3.23 | 42.42 | 1.63 | 11.8 | — |
| C7 | PC | Silicon carbide (0.4 μm) | 10 | 0 | 2.95 | 66.18 | 17.73 | NB | — |
| C8 | PC | Silicon carbide (8 μm) | 10 | 0 | 2.96 | 67.08 | 28.97 | NB | — |
| C9 | PC | Silicon carbide (8 μm) | 15 | 0 | 3.14 | 68.71 | 14.35 | NB | — |
| C10 | PC | Mica (6 μm) | 10 | 0 | 3.88 | 69.48 | 31.57 | 178.1 | 5.46 |
| C11 | PC | Epoxy-coated mica (55 μm) | 10 | 0 | 3.36 | 66.39 | 15.28 | 194.51 | — |
| C11 | PC | Hydrous aluminosilicate $^a$ ( ) | 10 | 0 | 3.41 | 71.91 | 10.01 | 202.31 | — |
| C12 | PC | — | 0 | 5 | 2.74 | 64.13 | 77.52 | NB | — |
| C13 | PC | — | 0 | 10 | 3.12 | 31.91 | 61.16 | NB | 6.64 |
| C14 | PC | — | 0 | 15 | 3.56 | 33.84 | 49.78 | NB | — |
| C15 | PC | — | 0 | 20 | 4.83 | 73.85 | 10.79 | 211.61 | — |
| C16 | ABS | — | 0 | 15 | 3.12 | 51.39 | 18.63 | 240.7 | — |

$^a$ Engelhard-ASP NC
$^f$ NYCO 1

As may be seen from the above results, omission of filler and fluoropolymer (C1) results in a composition having significantly lower tensile modulus and higher CTE.

Polycarbonate (LEXAN® 105, from General Electric Co.) and PTFE in the amounts shown in Table 7 (wt. %, based on the total weight of the composition) were subjected to dry blending and then fed into a ZSK 25 co-rotating twin-screw extruder from WERNER and PFLEIDERER Co. The composition was melt mixed at a barrel temperature of about 275° C. The torque was maintained at 80 percent at a screw rotation rate of 300 rpm and then fed into a high-speed pelletizer, yielding a pelletized composition. The resulting pellets were dried for at least 4 hours at 80° C. before injection molding into ASTM/ISO test specimens on an L&T Demag De-Tech 60T LNC4-E injection molding machine operated at a temperature of about 280° C. Comparative examples C17 and C18 were prepared without filler. Results are shown in Table 6.

TABLE 6

| | C17 | C18 | Ex. 42 | Ex. 43 |
|---|---|---|---|---|
| Polycarbonate | 97.5 | 95 | 92.5 | 85 |
| Fluoropolymer | 2.5 | 5 | 2.5 | 5 |
| Filler (Mica) | — | — | 5 | 10 |
| Tensile Modulus (GPa) | 2.62 | 2.69 | 3.53 | 4.75 |
| Yield Stress (MPa) | 58.70 | 58.66 | 63.14 | 68.85 |
| Yield Strain (%) | 6.04 | 5.98 | 5.20 | 4.44 |
| Break Stress (MPa) | 61.20 | 56.58 | 55.53 | 41.41 |
| Break Strain (%) | 82.44 | 74.00 | 67.42 | 37.53 |

Flame retardance testing was also conducted on comparative examples C19-C21 and Examples 44-48, each prepared and tested as described above, using the formulations shown in Table 8. "FOT" refers to the average flame out time of the sample. screw rotation rate of 300 rpm and then fed into a high-speed pelletizer, yielding a pelletized composition. The resulting pellets were dried for at least 4 hours at 80° C. before injection molding into ASTM/ISO test specimens on an L&T Demag De-Tech 60T LNC4-E injection molding machine operated at a temperature of about 280° C. Comparative examples C17 and C18 were prepared without filler. Results are shown in Table 6.

TABLE 6

| | C17 | C18 | Ex. 42 | Ex. 43 |
|---|---|---|---|---|
| Polycarbonate | 97.5 | 95 | 92.5 | 85 |
| Fluoropolymer | 2.5 | 5 | 2.5 | 5 |
| Filler (Mica) | — | — | 5 | 10 |
| Tensile Modulus (GPa) | 2.62 | 2.69 | 3.53 | 4.75 |
| Yield Stress (MPa) | 58.70 | 58.66 | 63.14 | 68.85 |
| Yield Strain (%) | 6.04 | 5.98 | 5.20 | 4.44 |
| Break Stress (MPa) | 61.20 | 56.58 | 55.53 | 41.41 |
| Break Strain (%) | 82.44 | 74.00 | 67.42 | 37.53 |

Flame retardance testing was also conducted on comparative examples C19-C21 and Examples 44-48, each prepared and tested as described above, using the formulations shown in Table 8. "FOT" refers to the average flame out time of the sample.

TABLE 7

|  | C19 | C20 | C21 | Ex. 44 | Ex. 45 | Ex. 46 | Ex. 47 | Ex. 48 |
|---|---|---|---|---|---|---|---|---|
| Polycarbonate | 67 | 57 | 57 | 54.5 | 52 | 47 | 62 | 57 |
| Bulk ABS | 8.11 | 8.11 | 8.11 | 8.11 | 8.11 | 8.11 | 8.11 | 8.11 |
| BPADP | 10 | 10 | 10 | 2.5 | 5 | 10 | 10 | 0 |
| PC-ST (20% Siloxane) | 15 | 15 | 15 | 15 | 15 | 15 | 0 | 15 |
| Filler (Mica) | — | 10 | — | 10 | 10 | 10 | 10 | 10 |
| Fluoropolymer | — | — | 10 | 10 | 10 | 10 | 10 | 10 |
| Tensile Modulus (Gpa) | 2.65 | 4.48 | 3.33 | 4.6 | 5.07 | 4.96 | 5.6 | 4.19 |
| Elong. at break (%) | 88% | 12% | 11.8 | 6.24 | 5.43 | 4.45 | 3.25 | 6.85 |
| Flexural Modulus (Gpa) | 2.3 | 3.9 | 2.59 | 3.8 | 3.9 | 4.2 | 4.8 | 3.5 |
| Flexural strength (Mpa) | 96.1 | 106.9 | 95.6 | 104.5 | 104.7 | 107.6 | 118.6 | 100.9 |
| Notched Izod Impact (KJ/m$^2$) | 64.4 | 8.9 | 15.3 | 10.1 | 10.6 | 9 | 7.7 | 12.3 |
| Flame performance, 1.5 mm | V-1 | V-0 | V-1 | V-1 | V-1 | V-0 | V-0 | — |
| 2nd Avg FOT | 5.6 | 3 | — | 7.6 | 5.2 | 3.8 | 2.3 | 18 |
| Flame performance, 1.2 mm | V-1 | V-1 | V-1 | V-1 | V-1 | V-1 | V-0 | — |
| 2nd Avg FOT | 8 | 7 | 12.6 | 12 | 9 | 6.2 | 3.2 | 19.6 |

The above results show that compositions can be formulated to provide good flame retardancy, even at lower loadings of flame retardants, together with a good combination of mechanical properties.

All patents and published articles cited herein are incorporated herein by reference.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A polymer composition comprising a combination of:
a matrix polymer component;
a fluoropolymer, wherein the fluoropolymer is encapsulated by an encapsulating polymer comprising a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination comprising at least one of the foregoing polymers; and
a filler, wherein the polymer composition has a tensile modulus of greater than or equal to about 3 GPa, and a nominal elongation at break of greater than or equal to about 20%, measured in accordance with ISO-527, using a rate of pull of 1 mm/minute followed by 5 mm/minute.

2. The composition of claim 1, having a nominal elongation at break of about 200 to about 20%, measured in accordance with ISO-527, using a rate of pull of 1 mm/minute followed by 5 mm/minute.

3. The composition of claim 1, having a tensile modulus of greater than or equal to about 3.5 GPa, and a nominal elongation at break greater than about 20%, measured in accordance with ISO-527, using a rate of pull of 1 mm/minute followed by 5 mm/minute.

4. The composition of claim 1, having a tensile modulus of greater than or equal to about 4.0 GPa, and a nominal elongation at break greater than about 50%, measured in accordance with ISO-527, using a rate of pull of 1 mm/minute followed by 5 mm/minute.

5. The composition of claim 1, having a CTE of less than about $5.5 \times 10^{-5}$ m/m/° C. (measured over −40 to 80° C.).

6. The composition of claim 1, having an unnotched Izod impact strength of greater than or equal to about 15 KJ/m$^2$, measured at room temperature in accordance with ISO 180U.

7. The composition of claim 1, wherein said matrix polymer comprises a polyvinyl chloride, a polyolefin, a polyester, a polyamide, a polysulfone, a polyimide, a polyetherimide, a polyether sulfone, a polyphenylene sulfide, a polyether ketone, a polyether ether ketone, an ABS, a polystyrene, a polybutadiene, a poly(acrylate), a poly(alkylacrylate), a polyacrylonitrile, a polyacetal, a polycarbonate, a polyphenylene ether, an ethylene-vinyl acetate copolymer, a polyvinyl acetate, a liquid crystal polymer, an aromatic polyester, an ethylene-tetrafluoroethylene copolymer, a polyvinyl fluoride, a polyvinylidene fluoride, a polyvinylidene chloride, or a tetrafluoroethylene different from the fluoropolymer, or a combination comprising at least one of the foregoing polymers.

8. The composition of claim 7, wherein said matrix polymer comprises polycarbonate or a combination comprising a polycarbonate.

9. The composition of claim 1, wherein said fluoropolymer comprises a homopolymer or copolymer comprising structural units derived from a fluorinated alpha-olefin monomer, or a fluorinated alpha-olefin monomer and a non-fluorinated monoethylenically unsaturated monomer.

10. The composition of claim 9, wherein said fluoropolymer comprises polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination comprising at least one of the foregoing polymers.

11. A polymer composition comprising:
a matrix polymer component wherein said matrix polymer comprises polycarbonate or a combination comprising a polycarbonate;
a fibrillatable fluoropolymer; and
a filler, wherein the fluoropolymer is fibrillated by in situ mixing with the matrix polymer and filler.

12. The composition of claim 1, comprising about 0.5 to about 60 weight percent of fluoropolymer, based on the total weight of the polymer composition.

13. The composition of claim 1, wherein said filler comprises calcium carbonate, mica, kaolin, talc, glass fibers, carbon fibers, carbon nanotubes, magnesium carbonate, sulfates of barium, calcium sulfate, titanium, nano clay, carbon black, silica, hydroxides of aluminum or ammonium or magnesium, zirconia, nanoscale titania, or a combination comprising at least one of the foregoing fillers.

14. The composition of claim 13, wherein said filler comprises mica, talc, silicon carbide, or a combination comprising at least one of the foregoing fillers.

15. The composition of claim 1, comprising about 0.5 to about 60 weight percent filler, based on the total weight of the polymer composition.

16. The composition of claim 11, wherein the fluoropolymer is encapsulated by an encapsulating polymer, said encapsulating polymer comprising a vinyl polymer, an acrylic polymer, a polyacrylonitrile, a polystyrene, a polyolefin, a polyester, a polyurethane, a polyamide, a polysulfone, a polyimide, a polyetherimide, a polyphenylene ether, a polyphenylene sulfide, a polyether ketone, a polyether ether ketone, an ABS resin, a polyethersulfone, a poly(alkenylaromatic) polymer, polybutadiene, a polyacetal, a polycarbonate, a polyphenylene ether, an ethylene-vinyl acetate copolymer, a polyvinyl acetate, a liquid crystal polymer, an aromatic polyester, a polyvinyl fluoride, polyvinylidene fluoride, polyvinylidene chloride, or a tetrafluoroethylene that is different from the fluoropolymer.

17. The composition of claim 11, wherein the polymer composition has a tensile modulus of greater than or equal to about 3 GPa, and a nominal elongation at break of greater than or equal to about 20%, measured in accordance with ISO-527 using a rate of pull of 1 mm/minute followed by 5 mm/minute.

18. The composition of claim 11 wherein said fibrillated fluoropolymer has a fibril diameter of about 5 nanometers to about 2 micrometers.

19. The composition of claim 11 wherein said fluoropolymer has a node fraction to fibril fraction ratio of less than or equal to about 2.

20. The composition of claim 11, further comprising a flame retardant additive.

21. The composition of claim 20, wherein a 1.5 mm thick sample of the composition achieves a UL-94 flame retardance rating of V1 and/or V0.

22. A mixed polymer composition comprising:
   a matrix polymer component wherein said matrix polymer comprises polycarbonate or a combination comprising a polycarbonate;
   a filler; and
   a fluoropolymer, wherein the fluoropolymer is fibrillated during mixing with the matrix polymer and/or filler to a degree effective to provide the composition with a higher tensile modulus than the same composition without fibrillation of the fluoropolymer.

23. An article comprising the composition of claim 1.

24. An article comprising the composition of claim 11.

25. An article comprising the composition of claim 22.

26. A method of forming an article, comprising shaping the composition of claim 1.

* * * * *